United States Patent Office 3,229,377
Patented Jan. 18, 1966

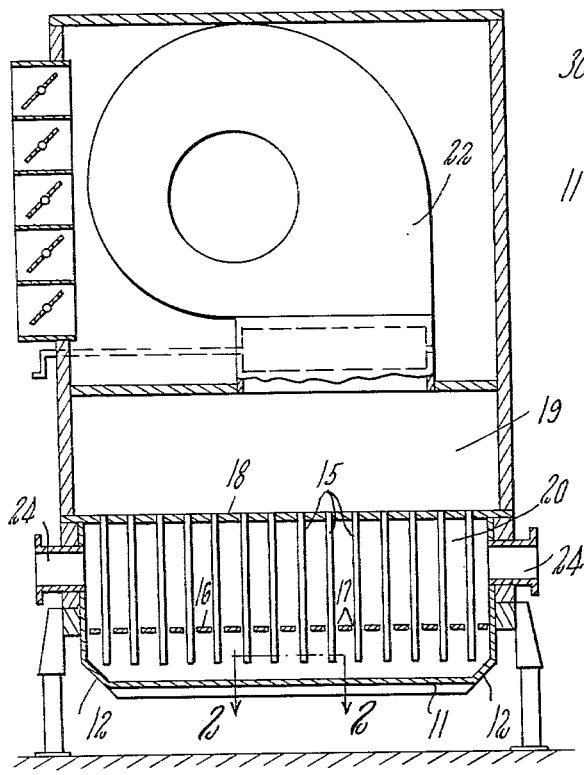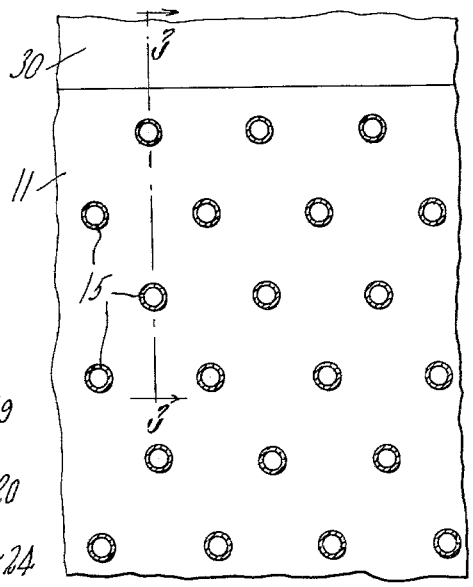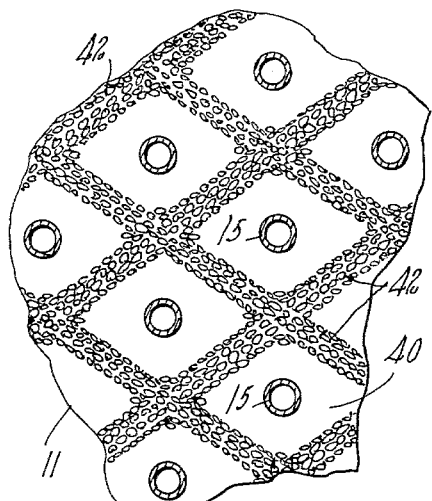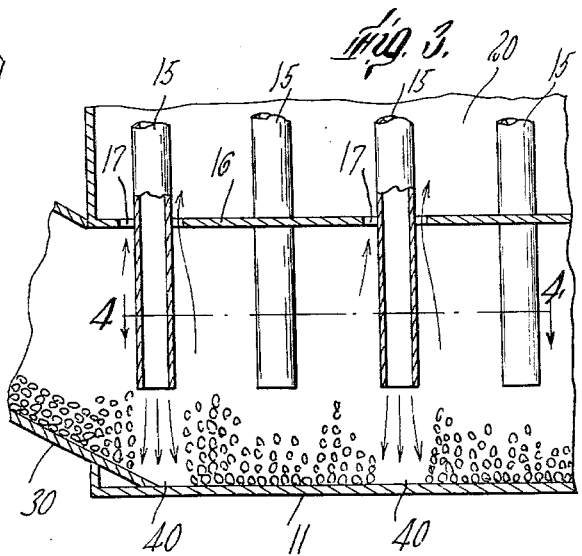

3,229,377
TREATMENT AND CONVEYANCE OF SOLID PARTICULATE MATERIAL BY A FLUID CURRENT
Charles W. Hoyt, West Newton, Mass., assignor to Wolverine Equipment Co., Cambridge, Mass., a corporation of Massachusetts
Filed June 13, 1962, Ser. No. 202,279
9 Claims. (Cl. 34—10)

This invention relates to the substantially horizontal conveyance of solid particulate material coincidental to treatment of the particulate material with a gaseous material brought into heat exchange or other treating relation therewith.

While flow of solid particulate materials by gravity in chutes is a well recognized method of conveyance, the loss in height involved is not always convenient, for example, in a one-story structure, and the rate of movement is often faster than desired where a treatment is to be carried out during the course of the conveyance. Accordingly, where gravity is not relied upon as the sole motivating force for bulk solid particle movement, mechanical, hydraulic or pneumatic driving forces are commonly utilized.

Mechanical driving means, such as endless belt or vibrating conveyors involve relatively expensive machinery; while hydraulic or pneumatic entraining systems tend to insulate the particles during the course of their conveyance, so that they either cannot be treated as desired while being conveyed or they are not as exposed to certain treatments along the line of conveyance as they would be if they were not entrained in the hydraulic or pneumatic carrier medium. For example, if drying is an intended function during conveyance, moisture picked up by a gaseous carrier cannot readily be removed from the carrier during the conveyance, nor can the particles be brought into heat exchange relationship with any fluid other than that existing in the carrier stream.

Accordingly, it is a purpose of this invention to create a substantially horizontal conveyance system for solid particles which does not involve their mechanical conveyance in contact with any moving or vibrating machinery nor entraining them in any fluid stream flowing undirectionally throughout the length of the path of conveyance. As a result, I provide a conveyance system for solid particles having any desired rate of progress less than that which gravity along could provide in a chute fall, without requiring contacting the particles with moving machine elements and wherein the particles may be exposed to a series of treatments along the path of conveyance without being insulated therefrom by reason of being entrained in a unidirectionally moving liquid or gaseous stream.

Conveyance of particles in accordance with this invention may be likened to the flow of a liquid, such as water, along a horizontal level trough, when fed down onto one end of the trough. In the case of solid particles, however, their coefficient of friction limits any such flow to the boundary defined by the angle of repose of any pile of particles deposited at the end of the trough precluding continuous flow in the manner of a liquid. This limiting factor is removed in accordance with this invention by, in effect, fluidizing the particles at their point of deposit in order to remove the restricting frictional effects whereby the horizontal components of force incident to or resulting from the depositing operation are utilized to move particles which have been freed of frictional effects by being suspended in a gaseous medium, away from the source of supply and in progressive succession along a horizontal trough which, as in the case of water, can be of indeterminate length, if the individual particles are kept in, or at least repeatedly returned to a fluidized state as they progress. The fluidized state is not created however by entraining the particles in a unidirectionally flowing stream of fluid.

Nor is it created in the normal manner of what is known as a fluidized bed, i.e., by blasting moving air up through the bed. Such latter type of operation is not suitable for my purposes. In accordance with this invention, the bed is fluidized by subjecting it to jets of air or other gas directed perpendicularly downwardly onto a flat sheet of gas-impervious material forming a stationary bed of the apparatus and withdrawing the air from each jet upwardly away from the bed. The velocity of the jets is such that when they impact upon the solid bed, the air flows outwardly along the bed substantially uniformly around a 360° arc tending to push any particles radially outwardly from the axis of each jet toward other jets and if the velocity be sufficeint, tending to pass under the particles and lift them off the bed as the air is deflected along the bed, encounters counterflow from adjacent jets and exhausts upwardly between the nozzles.

The surprising effect is that, if side guides on each side of the bed are properly arranged to prevent dead spots, and if a proper pattern of the jets is maintained, the particles will maintain an overall motion away from the end of the bed to which they are fed in sufficient quantity to maintain a head towards the exit end of the bed, i.e. to the end of the flat sheet, off of which they fall with subsequent removal by hand or by a moving conveyor, despite the fact that each individual jet causes particles beneath it to move radially outwardly randomly throughout a 360° arc.

It has been found that a pattern most conducive to cause the progression is a diamond pattern, with the jets being arranged in transverse rows and being staggered in alternate rows with respect to those in intermediate rows.

In some cases it may be desirable that the trough be not quite horizontal but have an inclination from the entering to the exit end less than that which would entirely overcome the effects of the coefficient of friction of the material if unfluidized and thus provide a gravity chute, but effective in association with the fluidized state of the advancing progression of particles to contribute to their advance.

A suitable arrangement is shown in a typical apparatus which functions in accordance with the invention, and which is shown in the accompanying drawings wherein:

FIG. 1 is a cross-sectional view of an apparatus in accordance with this invention;

FIG. 2 is a plan view of a pattern showing the spacings of the nozzles;

FIG. 3 is a detail vertical cross-sectional view of the feed end of the machine; and FIG. 4 is a diagrammatic detail of the mode of operation.

Apparatus of this invention can incorporate the features of an invention described and claimed in U.S. Patent No. 3,060,595 in the name of William P. Dapses, the apparatus being modified to accomplish the objective of conveying small particles along a stationary surface, as distinguished from conveying them when supported upon a moving surface.

To that end, apparatus of this invention while otherwise having a construction of the nature shown in FIG. 1 of said U.S. patent (except for a different nozzle pattern), does not include the belt conveyor 10 of said copending prior application, but rather supports the particles on a stationary plate or bed in opposition to the action of the jets. The stationary bed 11 shown in FIG. 1 terminates at its longitudinal edges in upwardly inclined side walls 12 which are at an approximately 45° angle to the plane of the stationary bed.

A suitable pattern of the tubes 15 is shown in FIG. 2. ¾ inch O.D. tubes having ⅝ inch orifices are spaced on 3½ inch centers transversely of the pattern and with the rows on 2½ inch centers. The transverse dimensions of the bed are such that the axes of the tubes along the sides of the pattern intersect the junction line between the stationary bed and the inclined side walls. Partition wall 16, parallel to bed 11, has exhaust ports 17, 1½ inches in diameter, for withdrawing the gas issuing from each jet, after being deflected by the bed 11 radially outwardly, upwardly through an annular channel surrounding each jet. Tubes 15 are suspended from a partition 18 which separates an upper plenum 19 from the exhaust chamber 20. A fan 22 controls the flow of air into plenum 19 and side ports 24 exhaust the gas from exhaust chamber 20. In some cases, gases exhausting at 24 may be recirculated in a closed circuit by connections not shown. Where drying or roasting is being done, a heater may be included in the closed circuit in accordance with known practice. Similarly refrigeration units can be included for cooling operations either in a closed or open circuit.

The incoming chute 30 at the feed end of the apparatus is at an inclination sufficient to cause gravity flow of the unfluidized particles to be conveyed as from a metering hopper and the first row of jets is so related dimensionally to the end of the chute 30 that particles being deposited from the chute onto the stationary bed 11 are fluidized by the jets and so agitated that, as shown in FIG. 3, they are given horizontal impacts by the incoming continuously fed material and are started along their path longitudinally of the stationary bed. Preferably the axes of the tubes 15 in the first row intersect the junction line between the chute 30 and the bed 11.

As shown in FIG. 4, the jets tend always to push the particles radially out from directly beneath the jets. In fact in most cases there are areas 40 of the stationary bed beneath each jet of generally circular or slightly diamond shape which are blown free of particles which are constantly urged into a two-dimensional matrix-like pathway 42 between the jets. Continuous three-dimensional build-up of the particles in these matrix areas causes them to move forwardly along the trough away from the feed because of the tidal-like advance of more particles from behind. This movement can be likened to that used to explain conduction of electricity, wherein each particle representing an electron moves into a position vacated by a preceding electron, the flow always taking place in the case of this apparatus along the two-dimensional matrix pathways. The inclined side walls 12 aid in returning side-blown particles inwardly towards the bed for advance and preventing stagnation of the particles at the edges of the apparatus.

When the temperature of the gas, usually air, issuing from the jets is different from that of the particles, a heat exchange takes place and the particles may be either cooled or heated, as desired, or have moisture removed in a drying operation by their contacting relation with the gaseous streams. The temperature of the gases emanating from the different rows may be varied if desired, but the weight of air issuing from all the nozzles should remain uniform unless the density of the particles changes along the path of advance due to the treatment, in which case equal amounts of fluidization may take place throughout the path with velocity change in gas of the same temperature or temperature change in gas of the same velocity, or both, to compensate for the change in particle density. In turn, thicker beds caused by greater feed volumes require greater velocities to maintain fluidization, depending upon the density of the particles.

Experience has shown that in roasting cocoa beans, the great volume of air at small temperature differential which is brought into contact with the beans cuts roasting times to about two minutes, compared with normal roasting times in rotary drums of the order of eight to ten times greater. Air velocities of about 12,000 ft./minute in the apparatus as described can roast approximately 100 lbs. of cocoa beans per hour per square foot of stationary bed surface 11.

Materials that can be successfully dried, roasted or toasted include rubber and plastic particles, coffee and cocoa beans, cocoa nibs, nuts, cereals and breakfast foods.

The partition 16 and exhaust ports 17 are not essential and may be omitted, since the overall volume of space between the nozzles results in an upward flow of the gas away from the stationary plate with greatly decreasing velocity. The partition 16 arrangement shown is however helpful in distributing the return flow uniformly above the bed 11 and minimizing any unidirectional horizontal flow of the gas in the zone of fluidization of the particles.

As previously stated, it is within the contemplation of this invention to tip the whole apparatus slightly in the direction of advance where a greater rate of movement is desired, since inclination of the bed will tend to advance individual particles as they gravitate back onto the bed by a slight angular deflection in the direction of the advancing bulk of particles.

What is claimed is:

1. Apparatus for the substantially horizontal conveyance of solid particulate material, comprising a stationary gas-impervious plate forming a bed having an inclination less than that which would cause gravity flow of the particulate material to be conveyed, side walls extending along the edges of said bed to form with said bed an open ended trough, means for continuously feeding solid particles onto said stationary plate at one end thereof to form a head of said particles at the feed end of said plate, a series of spaced nozzles extending perpendicularly downwardly towards said trough and terminating in orifices disposed to direct gas passing through said nozzles perpendicularly downwardly against said stationary plate, said orifices lying in a single plane spaced above said plate, means for exhausting gases emanating from said nozzles upwardly away from said plate between said nozzles, and means for flowing gas through said nozzles at high velocity to fluidize particles in said trough which thereupon advance along said trough and out of the end thereof under the influence of the horizontal component of motion imparted to the individual fluidized particles as the result of creation of the head of particles by said feed means at the feed end of said bed.

2. Apparatus for the substantially horizontal conveyance of solid particulate material, comprising a stationary gas-impervious plate forming a bed having an inclination less than that which would cause gravity flow of the particulate material to be conveyed, side walls extending along the edges of said bed to form with said bed an open ended trough, means for continuously feeding solid particles onto said plate at one end thereof to form a head of said particles at the feed end of said plate, a series of spaced nozzles extending perpendicularly downwardly towards said trough and terminating in orifices disposed to direct gas passing through said nozzles perpendicularly downwardly against said plate, said orifices lying in a single plane spaced above said plate, means for exhausting gases emanating from said nozzles upwardly away from said trough between said nozzles, said nozzles being arranged in a diamond-pattern array with the axes of the first row of nozzles being positioned to intersect a stream of particles being fed onto said bed by said feeding means, and means for flowing gas through said nozzles at high velocity to fluidize particles in said trough and out of the end thereof which thereupon advance along said trough under the influence of the horizontal component of motion imparted to the individual fluidized particles as the result of creation of the head of particles by said feed means at the feed end of said bed.

3. Apparatus as claimed in claim 2, wherein the feeding means is a gravity chute having a junction line with the feed end of said plate, and the axes of the nozzles in said first row intersect said junction line.

4. Apparatus for the substantially horizontal conveyance of solid particulate material, comprising a substantially horizontal stationary gas-impervious plate forming a bed, side walls extending along the edges of said bed at an inclination thereto to form with said bed an open ended trough, feed means for continuously flowing solid particles down onto said plate at one end thereof to form a head of said particles at the feed end of said plate, a series of spaced nozzles extending perpendicularly downwardly towards said trough and terminating in orifices disposed to direct gas passing through said nozzles perpendicularly downwardly against said plate, said orifices lying in a sinlge plane spaced above said bed, a wall extending parallel to said bed above the plane of said orifices and having apertures therein for exhausting gases emanating from said nozzles upwardly away from said plate between said nozzles, said nozzles being arranged in a diamond-pattern array with the axes of the first row of nozzles being positioned to intersect a stream of particles as they flow down onto said bed from said feed means, and means for flowing gas through said nozzles at high velocity to fluidized particles in said trough as they advance along said trough and out the end thereof into the paths of the individual streams of gas issuing from each nozzle, under the influence of the horizontal component of motion imparted to the individual particles as the result of creation of the head of particles by said feed means at said feed end of said bed.

5. Apparatus as claimed in claim 4, wherein the axes of the nozzles at the sides of said pattern intersect the junction lines of said bed and said inclined side walls.

6. The method for continuous conveyance of small solid particles along a substantially horizontally path comprising feeding solid particles continuously into one end of a stationary, open ended substantially horizontal gas-impervious trough extending throughout the length of the path of proposed conveyance to form a head of said particles at the feed end of said trough, and fluidizing the particles in the trough by directing continuously flowing jets of gas spaced in rows perpendicularly downwardly into contact with said trough and reversely withdrawing the gas as it is deflected by said trough upwardly away from said trough between said jets to cause later fed particles to impart horizontal advance along said trough to previously fed particles so fluidized, and cause an overall advance of said particles along and through paths extending around and between the jets in each row and out of the end of the trough.

7. The method as claimed in claim 6, wherein the gas from each jet is withdrawn upwardly through an annular channel surrounding that jet.

8. The method for continuous conveyance of small solid particles along a substantially horizontal path comprising flowing solid particles continuously in succession by gravity down into one end of a gas-impervious stationary, open-ended substantially horizontal trough extending throughout the length of the path of proposed conveyance to form a head of said particles at the feed end of said trough, fluidizing the particles as they flow into said trough by directing spaced continuously flowing jets of gas perpendicularly downwardly into contact with said trough and reversely withdrawing the gas as it is deflected by said trough upwardly away from said trough between said jets to cause later fed particles flowing into said trough to impart horizontal advance along said trough in paths extending around and between said jets to previously fed particles so fluidized, and similarly repeatedly fluidizing said particles as they tend to gravitate onto said trough during their advance along said paths and out of the end of the trough.

9. The method as claimed in claim 8, wherein the gas from each jet is withdrawn upwardly through an annular channel surrounding that jet.

References Cited by the Examiner

UNITED STATES PATENTS

| | | | |
|---|---|---|---|
| 2,042,610 | 6/1936 | Littleton | 34—156 |
| 2,331,419 | 10/1943 | Patterson | 34—164 |
| 2,401,520 | 6/1946 | Spooner | 34—232 |
| 2,774,637 | 12/1956 | Sylvest | 302—29 |
| 3,060,590 | 10/1962 | Brown | 34—155 |

FOREIGN PATENTS 325,611  5/1918  Germany.

WILLIAM F. O'DEA, *Acting Primary Examiner.*

CHARLES E. O'CONNELL, *Examiner.*